United States Patent
Gormley

(10) Patent No.: US 11,781,502 B2
(45) Date of Patent: Oct. 10, 2023

(54) ACTUATION SYSTEM FOR A THRUST REVERSER OF AN AIRCRAFT PROPULSION SYSTEM

(71) Applicant: Rohr, Inc., Chula Vista, CA (US)

(72) Inventor: Timothy Gormley, Bonita, CA (US)

(73) Assignee: ROHR, INC., Chula Vista, CA (US)

( * ) Notice: Subject to any disclaimer, the term of this patent is extended or adjusted under 35 U.S.C. 154(b) by 8 days.

(21) Appl. No.: 17/307,603

(22) Filed: May 4, 2021

(65) Prior Publication Data

US 2022/0065195 A1 Mar. 3, 2022

Related U.S. Application Data

(60) Provisional application No. 63/020,273, filed on May 5, 2020.

(51) Int. Cl.
| | |
|---|---|
| *F02K 1/76* | (2006.01) |
| *F02K 1/72* | (2006.01) |
| *F16H 37/12* | (2006.01) |
| *F16H 57/04* | (2010.01) |

(52) U.S. Cl.
CPC ............ *F02K 1/763* (2013.01); *F02K 1/72* (2013.01); *F16H 37/122* (2013.01); *F16H 57/0426* (2013.01); *F05D 2260/40311* (2013.01); *F05D 2260/53* (2013.01)

(58) Field of Classification Search
CPC .......... F02K 1/763; F02K 1/72; F16H 37/122; F16H 57/0426; F05D 2260/40311; F05D 2260/53
See application file for complete search history.

(56) References Cited

U.S. PATENT DOCUMENTS

| | | | |
|---|---|---|---|
| 6,094,908 A * | 8/2000 | Baudu | F02K 1/76 244/110 B |
| 6,167,694 B1 * | 1/2001 | Davies | F02K 1/763 74/89.23 |
| 8,511,062 B2 | 8/2013 | Ramlaoui | |
| 9,021,813 B2 | 5/2015 | Jasklowski | |
| 10,422,301 B2 | 9/2019 | Karnofski | |
| 2003/0070416 A1 * | 4/2003 | Johnson | F02K 1/76 60/226.2 |
| 2008/0289317 A1 | 11/2008 | Dehu | |
| 2011/0094324 A1 * | 4/2011 | Davies | F02K 1/763 74/25 |

(Continued)

FOREIGN PATENT DOCUMENTS

EP 0801220 A2 10/1997

OTHER PUBLICATIONS

EP search report for EP21172259.0 dated Jan. 10, 2022.

*Primary Examiner* — Andrew H Nguyen
(74) *Attorney, Agent, or Firm* — Getz Balich LLC

(57) ABSTRACT

An assembly is provided for an aircraft propulsion system. This assembly includes a first actuator, a second actuator and a linkage system. The linkage system is configured to transfer torque between the first actuator and the second actuator. The linkage system includes a first linkage shaft, a second linkage shaft and a gearbox. The first linkage shaft has a first centerline. The second linkage shaft has a second centerline offset from the first centerline. The gearbox is coupled to and is between the first linkage shaft and the second linkage shaft.

15 Claims, 9 Drawing Sheets

(56) References Cited

U.S. PATENT DOCUMENTS

| | | | |
|---|---|---|---|
| 2011/0296812 A1* | 12/2011 | Abel | F02K 1/763 |
| | | | 310/83 |
| 2016/0169158 A9 | 6/2016 | Ramlaoui | |
| 2017/0321635 A1* | 11/2017 | Mansouri | F02K 1/76 |
| 2018/0163663 A1* | 6/2018 | Hudson | F15B 15/18 |
| 2021/0156280 A1* | 5/2021 | Gebhard | F16N 7/385 |
| 2021/0340934 A1 | 11/2021 | Polcuch | |

* cited by examiner

ACTUATION SYSTEM FOR A THRUST REVERSER OF AN AIRCRAFT PROPULSION SYSTEM

This application claims priority to U.S. Patent Appln. No. 63/020,273 filed May 5, 2020, which is hereby incorporated herein by reference in its entirety.

BACKGROUND

1. Technical Field

This disclosure relates generally to an aircraft propulsion system and, more particularly, to an actuation system for a thrust reverser of the aircraft propulsion system.

2. Background Information

Various types and configurations of actuation systems are known in the art for moving components of a thrust reverser system. While these known actuation systems have various benefits, there is still room for improvement, particularly as space/packaging constraints within aircraft propulsion systems increase. There is a need in the art therefore for an improved thrust reverser actuation system.

SUMMARY OF THE DISCLOSURE

According to an aspect of the present disclosure, an assembly is provided for an aircraft propulsion system. This assembly includes a first actuator, a second actuator and a linkage system. The linkage system is configured to transfer torque between the first actuator and the second actuator. The linkage system includes a first linkage shaft, a second linkage shaft and a gearbox. The first linkage shaft has a first centerline. The second linkage shaft has a second centerline offset from the first centerline. The gearbox is coupled to and is between the first linkage shaft and the second linkage shaft.

According to another aspect of the present disclosure, another assembly is provided for an aircraft propulsion system. This assembly includes a first actuator, a second actuator and a linkage system. The linkage system is coupled to and extends between the first actuator and the second actuator. The linkage system includes a first linkage shaft, a second linkage shaft and a gearbox. The first linkage shaft is non-coaxial with the second linkage shaft. The gearbox is coupled to and is between the first linkage shaft and the second linkage shaft.

According to still another aspect of the present disclosure, another assembly is provided for an aircraft propulsion system. This assembly includes a first linear actuator, a second linear actuator and a linkage system. The first linear actuator includes a first rotational coupling. The second linear actuator includes a second rotational coupling. The linkage system is connected to and extends between the first rotational coupling and the second rotational coupling. The linkage system includes a first linkage shaft, a second linkage shaft and a gearbox coupled to and between the first linkage shaft and the second linkage shaft.

The first linkage shaft may extend circumferentially about an axis in a first plane. The second linkage shaft may extend circumferentially about the axis in a second plane that is offset from the first plane.

The first actuator may be configured as or otherwise include a first hydraulically driven actuator. In addition or alternatively, the second actuator may be configured as or otherwise include a second hydraulically driven actuator.

The first actuator may be configured as or otherwise include a first electrically driven actuator. In addition or alternatively, the second actuator may be configured as or otherwise include a second electrically driven actuator.

The linkage system may be coupled to and/or may extend between the first actuator and the second actuator.

The first actuator and/or the second actuator may each be configured as or otherwise include a linear actuator.

The first actuator and/or the second actuator may each be configured as or otherwise include a hydraulically driven actuator.

The first actuator and/or the second actuator may each be configured as or otherwise include an electrically driven actuator.

The assembly may include a motor configured to drive at least the first actuator through the linkage system.

The motor may be configured as or otherwise include an electric motor.

The linkage system may extend circumferentially about a rotational axis of the aircraft propulsion system from the first actuator to the second actuator.

The first linkage shaft and/or the second linkage shaft may each be configured as or otherwise include a flex shaft.

The first linkage shaft and/or the second linkage shaft may each be configured as or otherwise include a flexible coupling.

The first linkage shaft may extend circumferentially about an axis. The first linkage shaft may lay in a flat plane perpendicular to the axis.

The first linkage shaft may include a first lubricant flow passage. The second linkage shaft may include a second lubricant flow passage. The gearbox may fluidly couple the first lubricant flow passage to the second lubricant flow passage.

The gearbox may include a first gear, a second gear and an idler gear meshed with and between the first gear and the second gear. The first gear may be coupled with the first linkage shaft. The second gear may be coupled with the second linkage shaft.

The gearbox may include a first gear, a second gear and a ring gear meshed with and circumscribing the first gear and the second gear. The first gear may be coupled with the first linkage shaft. The second gear may be coupled with the second linkage shaft.

The linkage system may also include a third linkage shaft and a second gearbox. The third linkage shaft may have a third centerline offset from the second centerline. The second gearbox may be coupled to and/or may be between the second linkage shaft and the third linkage shaft.

The first linkage shaft and the third linkage shaft may lie in a common plane. The second linkage shaft may lay in another plane offset from the common plane.

The assembly may also include a movable component of the aircraft propulsion system. At least the first actuator may be configured to move the movable component between a first (e.g., stowed) position and a second (e.g., deployed) position.

The moveable component may be configured as or otherwise include a translating sleeve. The moveable component may alternatively be configured as or otherwise include a component of a variable area nozzle. The moveable component may alternatively be configured as or otherwise include a translating inlet structure of a nacelle, or any other component of the aircraft propulsion system.

The assembly may also include a translating sleeve. At least the first actuator may be configured to move the translating sleeve between a stowed position and a deployed position.

The assembly may also include a thrust reverser component. At least the first actuator may be configured to move the thrust reverser component between a first position and a second position.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
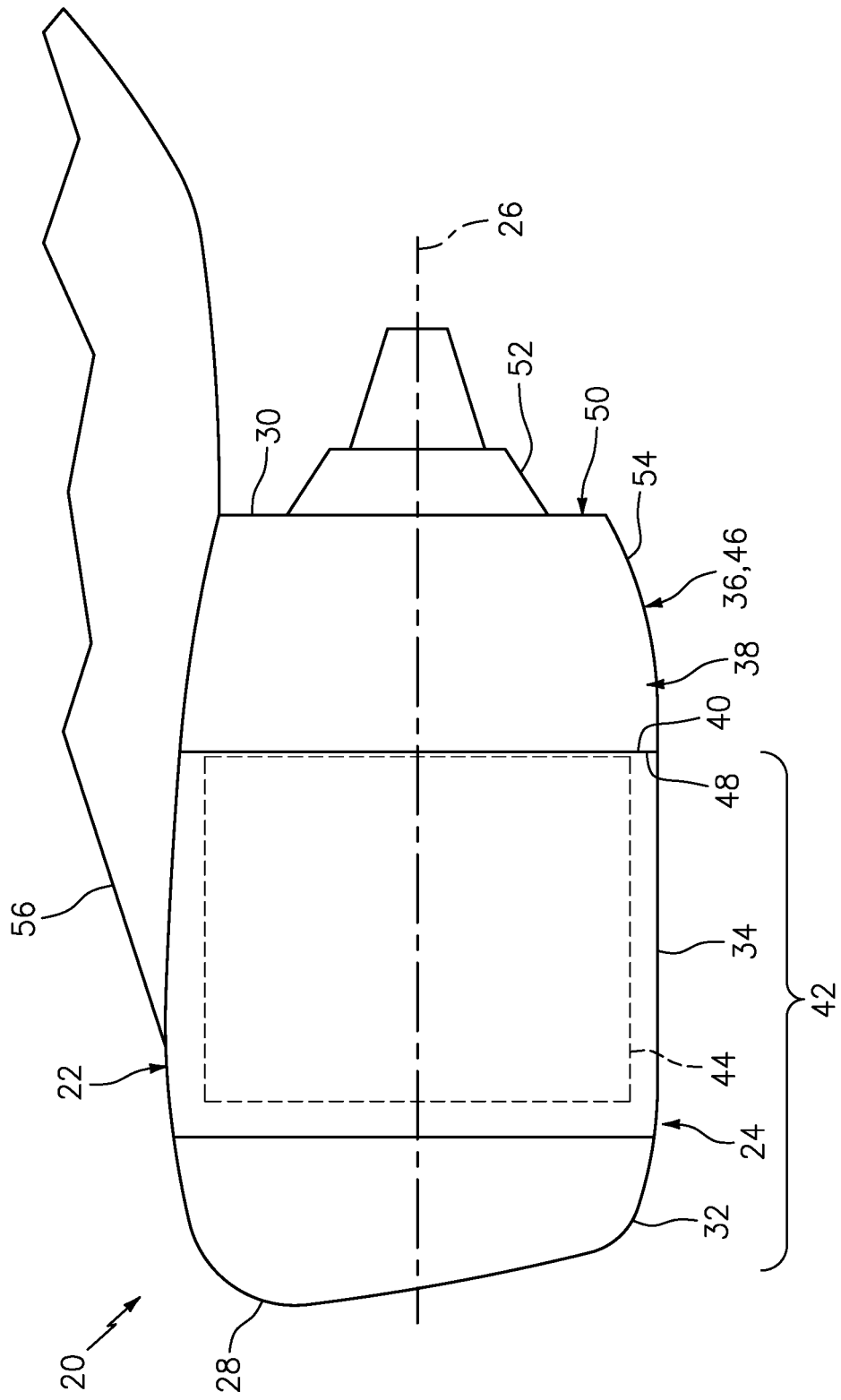
FIG. 1 is a side illustration of an aircraft propulsion system with its thrust reverser sleeve in a stowed position.

FIG. 1 illustrates an aircraft propulsion system 20 for an aircraft such as, but not limited to, a commercial airliner or cargo plane. The aircraft propulsion system 20 includes a nacelle 22 and a gas turbine engine. This gas turbine engine may be configured as a high-bypass turbofan engine. Alternatively, the gas turbine engine may be configured as any other type of gas turbine engine capable of propelling the aircraft during flight.

The nacelle 22 is configured to house and provide an aerodynamic cover for the gas turbine engine. An outer structure 24 of the nacelle 22 extends along an axial centerline 26 between a nacelle forward end 28 and a nacelle aft end 30, which axial centerline 26 may also be a rotational axis of the aircraft propulsion system 20 and its gas turbine engine. The nacelle 22 of FIG. 1 includes a nacelle inlet structure 32, one or more fan cowls 34 (one such cowl visible in FIG. 1) and a nacelle aft structure 36, which is configured as part of or includes a thrust reverser system 38.

The inlet structure 32 is disposed at the nacelle forward end 28. The inlet structure 32 is configured to direct a stream of air through an inlet opening at the nacelle forward end 28 and into a fan section of the gas turbine engine.

The fan cowls 34 are disposed axially between the inlet structure 32 and the aft structure 36. Each fan cowl 34 of FIG. 1, in particular, is disposed at an aft end 40 of a stationary portion 42 of the nacelle 22, and extends axially forward along the axial centerline 26 to the inlet structure 32. Each fan cowl 34 is generally axially aligned with a fan section of the gas turbine engine. The fan cowls 34 are configured to provide an aerodynamic covering for a fan case 44. Briefly, this fan case 44 circumscribes the fan section and may partially form a forward outer peripheral boundary of a bypass flowpath of the aircraft propulsion system 20.

The term "stationary portion" is used above to describe a portion of the nacelle 22 that is stationary during aircraft propulsion system 20 operation (e.g., during takeoff, aircraft flight and landing). However, the stationary portion 42 may be otherwise movable for aircraft propulsion system 20 inspection/maintenance; e.g., when the aircraft propulsion system 20 is non-operational. Each of the fan cowls 34, for example, may be configured to provide access to components of the gas turbine engine such as the fan case 44 and/or peripheral equipment configured therewith for inspection, maintenance and/or otherwise. In particular, each of fan cowls 34 may be pivotally mounted with the aircraft propulsion system 20 by, for example, a pivoting hinge system. The present disclosure, however, is not limited to the foregoing fan cowl configurations and/or access schemes.

The aft structure 36 includes a translating sleeve 46 of the thrust reverser system 38. The translating sleeve 46 of FIG. 1 is disposed at the nacelle aft end 30. This translating sleeve 46 extends axially along the axial centerline 26 between a forward end 48 thereof and the nacelle aft end 30. The translating sleeve 46 is configured to partially form an aft outer peripheral boundary of the bypass flowpath. The translating sleeve 46 may also be configured to form a bypass nozzle 50 for the bypass flowpath with an inner structure 52 of the nacelle 22 (e.g., an inner fixed structure (IFS)), which nacelle inner structure 52 houses a core of the gas turbine engine.

The translating sleeve 46 of FIG. 1 includes a pair of translating sleeve segments 54 (e.g., halves) arranged on opposing sides of the aircraft propulsion system 20 (one such sleeve segment visible in FIG. 1). The present disclosure, however, is not limited to such an exemplary translating sleeve configuration. For example, the translating sleeve 46 may alternatively have a substantially tubular body. For example, the translating sleeve 46 may extend more than three-hundred and thirty degrees (330°) around the axial centerline 26.

Figure 2:
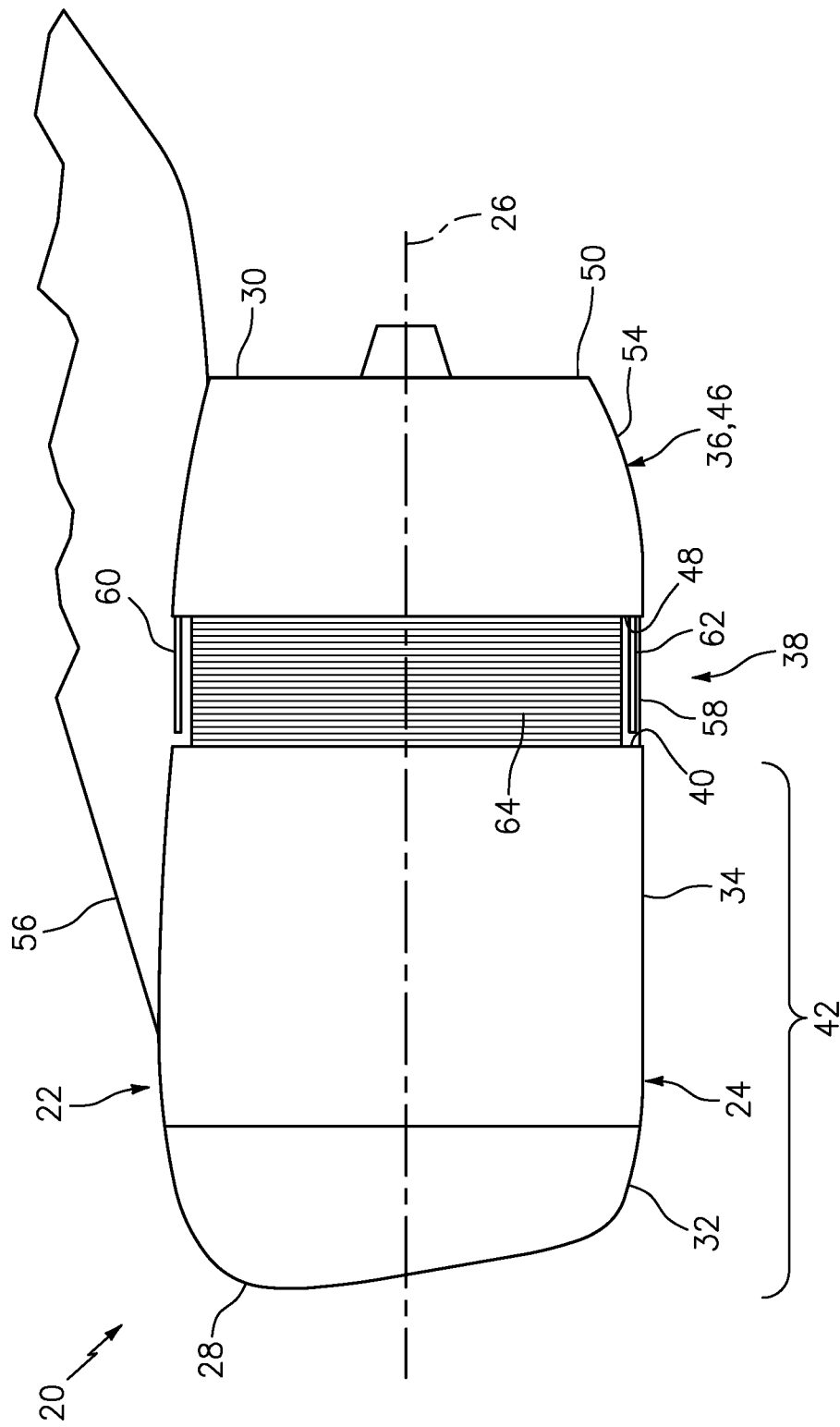
FIG. 2 is a side illustration of the aircraft propulsion system with its thrust reverser sleeve in a deployed position.

Referring to FIGS. 1 and 2, the translating sleeve 46 is an axially translatable structure. Each translating sleeve segment 54 of FIG. 2, for example, may be slidably connected to one or more stationary structures (e.g., a pylon 56 and a lower bifurcation 58) through one or more respective track assemblies 60 and 62. Each track assembly 60, 62 may include a rail mated with a track beam; however, the present disclosure is not limited to the foregoing exemplary sliding connection configuration.

With the foregoing configuration, the translating sleeve 46 may translate axially along the axial centerline 26 and relative to the stationary portion 42. The translating sleeve 46 may thereby move axially between a forward stowed position (see FIG. 1) and an aft deployed position (see FIG. 2). In the forward stowed position, the translating sleeve 46 provides the functionality described above. In the aft deployed position, the translating sleeve 46 at least partially (or substantially completely) uncovers at least one or more other components of the thrust reverser system 38 such as, but not limited to, one or more (e.g., fixed or translating) cascade structures 64. In addition, as the translating sleeve 46 moves from the stowed position to the deployed position, one or more blocker doors (not shown) arranged with the translating sleeve 46 may be deployed to divert bypass air from the bypass flowpath and through the cascade structures 64 to provide reverse thrust.

Figure 3:
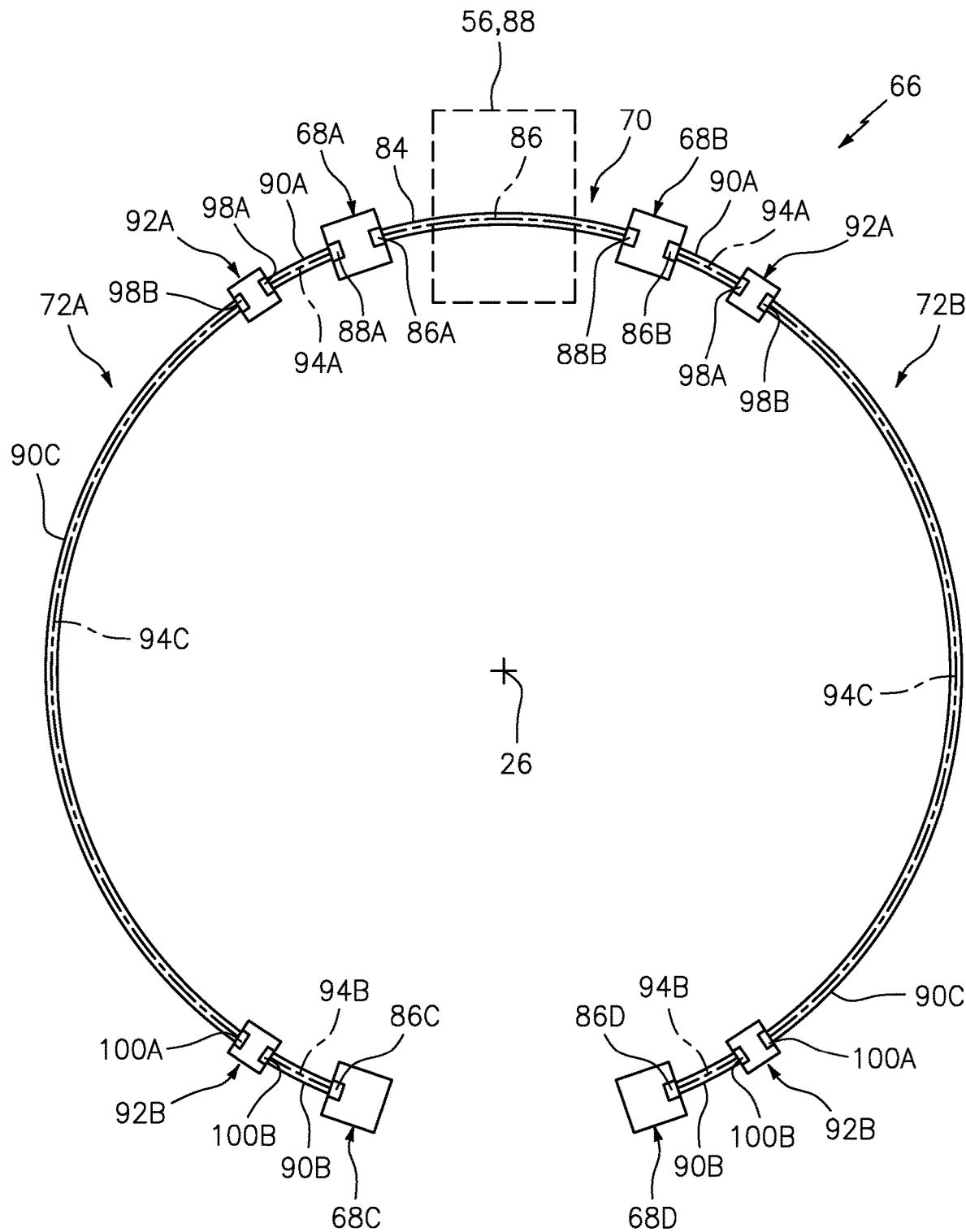
FIG. 3 is a schematic illustration of an actuation system for moving a component of a thrust reverser system.
Figure 4:
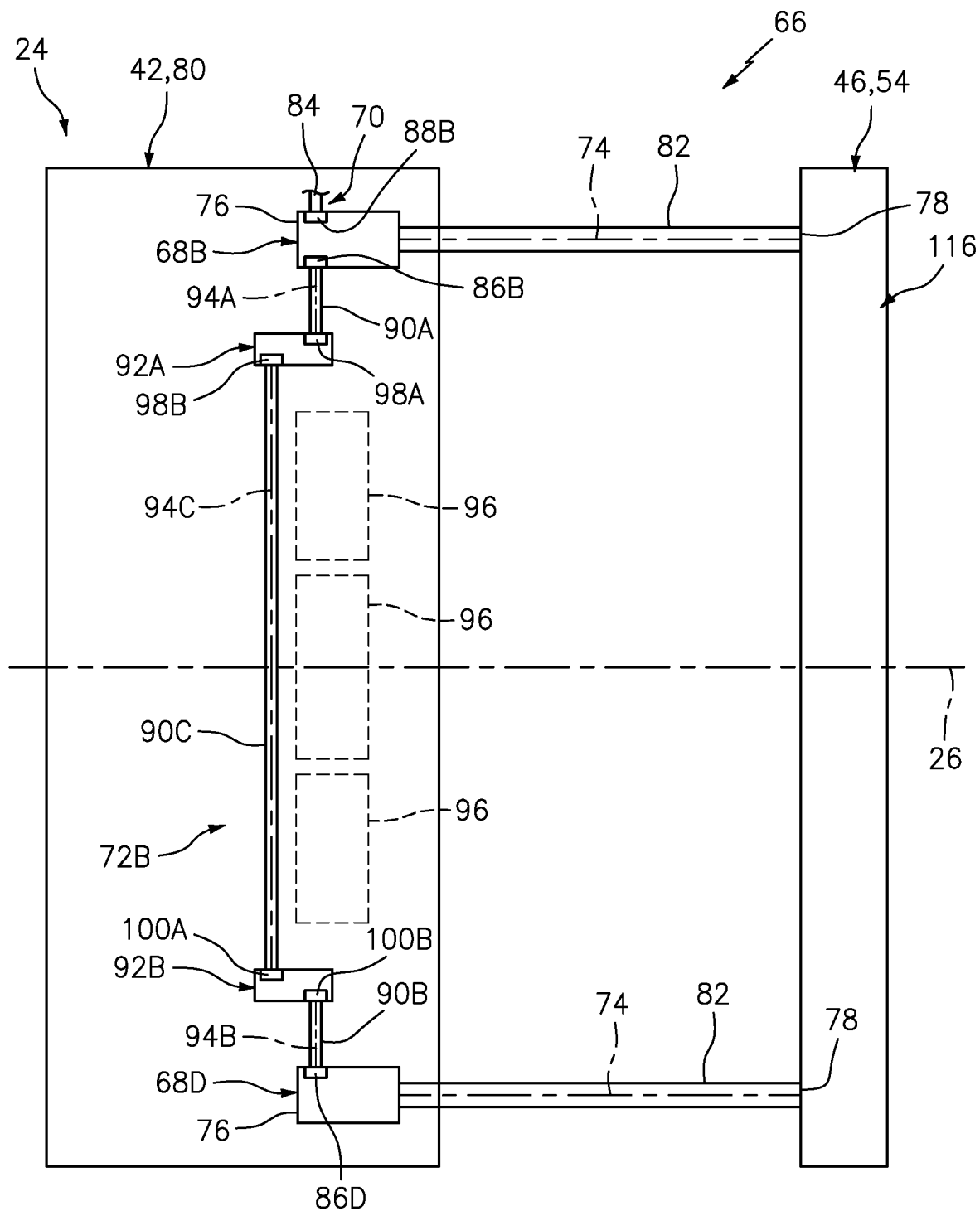
FIG. 4 is another schematic illustration of the actuation system.

FIGS. 3 and 4 schematically illustrate an actuation system 66 for the translating sleeve 46. This actuation system 66 is configured to move (e.g., axially translate) the translating sleeve 46 and each of its segments 54 between the forward stowed position (see FIG. 1) and the aft deployed position (see FIG. 2). This actuation system 66 includes one or more actuators 68A-D (generally referred to as "68") and one or more linkage systems 70 and 72A-B (generally referred to as "72").

Each actuator 68 may be configured as a linear actuator. Examples of such a linear actuator include, but are not limited to, a lead screw actuator and a hydraulic cylinder actuator. The present disclosure, however, is not limited to such exemplary linear actuators not to any specific type of actuator.

Each actuator 68 of FIG. 4 extends along a respective actuator centerline 74 between an actuator forward end 76 (e.g., a stationary end) and an actuator aft end 78 (e.g., a translating end), which centerline 74 may be parallel with the axial centerline 26. Each actuator 68 is mechanically fastened (e.g., pinned) or otherwise connected to a stationary structure 80 (e.g., a torque box) at (e.g., on, adjacent or proximate) its forward end 76, which stationary structure 80 may be included as part of, housed within and/or attached to the stationary portion 42 (see FIG. 1). Each actuator 68 is mechanically fastened (e.g., pinned) or otherwise connected to the translating sleeve 46 and a respective translating sleeve segment 54. For example, each actuator 68 may be connected to the components 46, 54 at (e.g., on, adjacent or proximate) its aft end 78. Alternatively, each actuator 68 may include a moveable (e.g., translatable) component that moves longitudinally along the actuator 68. Each actuator 68 of FIG. 4 includes a translating member 82 (e.g., a lead screw or a telescopic device) which enables the respective actuator 68 to move (e.g., translate) its aft end 78 (or its moveable component) relative to its forward end 76 along the respective actuator centerline 74.

Referring to FIG. 3, the actuators 68 are configured about the axial centerline 26 in an annular array. The actuators 68A-B may be arranged proximate a top end of the nacelle 22 on opposing sides of the nacelle 22. The actuators 68C-D may be arranged proximate a bottom end of the nacelle 22 on opposing sides of the nacelle 22.

The intermediate linkage system 70 is configured as or otherwise includes a cross-over shaft 84. This cross-over shaft 84 is mechanically/rotationally coupled to and links respective elements 86A and 88B (e.g., input/output shafts, receptacles or other types of couplings) of the actuators 68A-B. The cross-over shaft 84 may thereby transfer torque between (e.g., time and/or drive) the actuators 68A-B, which may enable the actuators 68A-B to move simultaneously during thrust reverser system 38 operation.

The cross-over shaft 84 extends along its centerline 86 between the actuators 68A-B while, for example, projecting through and/or extending around one or more obstacles 88. These obstacles 88 may be fixed structures of the aircraft propulsion system 20 such as, but not limited to, the pylon 56 for mounting the aircraft propulsion system 20 to an aircraft body member; e.g., an aircraft wing. An example of the cross-over shaft 84 is a flex shaft. The present disclosure, however, is not limited to such an exemplary cross-over shaft. In the specific embodiment of FIG. 3, the cross-over shaft 84 lies in a (e.g., flat) cross-over shaft plane that is, for example, perpendicular to the axial centerline 26.

Each of the side linkage systems 72A, 72B is mechanically/rotationally coupled to and links respective elements 88A and 86C, 86B and 86D (e.g., input/output shafts, receptacles or other types of couplings) of the actuators 68A and 68C, 68B and 68D. Each side linkage system 72A, 72B may thereby transfer torque between (e.g., time and/or drive) the actuators 68A and 68C, 68B and 68D, which may enable the actuators 68A-D to move simultaneously during thrust reverser operation. Each side linkage system 72A, 72B, for example, includes a plurality of linkage shafts 90A-C (generally referred to as "90") and one or more gearboxes 92A-B (generally referred to as "92").

Each linkage shaft 90A-C extends along a centerline 94A-C (generally referred to as "94") thereof between opposing linkage shaft ends. As each linkage shaft 90 extends longitudinally along its centerline 94, that linkage shaft 90 may also extends circumferentially about the axial centerline 26 such that, for example, the linkage shaft 90 has a generally arcuate shape. This arcuate shape may have a two-dimensional (2D) curvature. Each linkage shaft 90 of FIGS. 3 and 4, for example, lies in a respective (e.g., flat) side linkage shaft plane that is, for example, perpendicular to the axial centerline 26. In the specific embodiment of FIG. 4, the intermediate linkage shaft plane is offset from (e.g., non-coaxial with) the end linkage shaft planes. The intermediate linkage shaft centerline 94C of FIG. 4, for example, is axially displaced from the end linkage shaft centerlines 94A-B along the axial centerline 26. However, the end linkage shaft centerlines 94A-B may (or may not) lie in a common plane. The intermediate linkage shaft 90C may thereby enable the respective side linkage system 72 to avoid one or more obstacles 96 within the nacelle outer structure 24.

The first (e.g., top) end linkage shaft 90A extends between and is coupled to the actuator 68A or 68B and the gearbox 92A. More particularly, one of the linkage shaft ends is coupled to the actuator element 88A or 86B and the other one of the linkage shaft ends is coupled to an element 98A (e.g., input/output shaft, receptacle or any other type of coupling) of the gearbox 92A.

The second (e.g., bottom) end linkage shaft 90B extends between and is coupled to the actuator 68C or 68D and the gearbox 92B. More particularly, one of the linkage shaft ends is coupled to the actuator element 86C or 86D and the other one of the linkage shaft ends is coupled to an element 100B (e.g., input/output shaft, receptacle or any other type of coupling) of the gearbox 92B.

The intermediate linkage shaft 90C extends between and is coupled to the gearboxes 92. More particularly, one of the linkage shaft ends is coupled to an element 98B (e.g., input/output shaft, receptacle or any other type of coupling) of the gearbox 92A and the other one of the linkage shaft ends is coupled to an element 100A (e.g., input/output shaft, receptacle or any other type of coupling) of the gearbox 92B.

Each linkage shaft 90 may be a flex shaft. Alternatively, any one or more of the linkage shafts 90 may be configured as a flexible coupling such as, for example, an elastomeric shaft. The present disclosure, however, is not limited to such an exemplary linkage shaft configuration.

Each of the gearboxes 92 is configured to enable respective ones of the linkage shafts 90 to be offset from one another, for example, along the axial centerline 26. Each of the gearboxes 92 is further configured to mechanically/rotationally couple the respective linkage shafts 90. Each of the gearboxes 92 may thereby transfer torque between the respective linkage shafts 90. Various types and configurations of gearboxes are known in the art, and the present disclosure is not limited to any particular ones thereof.

In some embodiments, one or more or each of the actuators 68 may be configured as a self-driven actuator. Each of the actuators 68, for example, may be a hydraulically driven actuator. Thus, each actuator 68 may be configured to receive hydraulic fluid that causes movement of its respective aft end 78 (or its moveable component) and, thus, the respective coupling to the translating sleeve 46. In such embodiments, the linkage systems 70 and 72 enable timing of the actuators 68. For example, if one of the actuators 68 had a tendency to move faster than another one of the actuators 68 (if discretely arranged), the tying together of those actuators 68 through the linkage system(s) 70, 72 would prevent disproportional movement. In other words, the fastener actuator 68 may pull the slower actuator 68 along through the linkage system(s) 70, 72 and/or the slower actuator 68 may hold the faster actuator 68 back through the linkage system(s) 70, 72.

Figure 5:
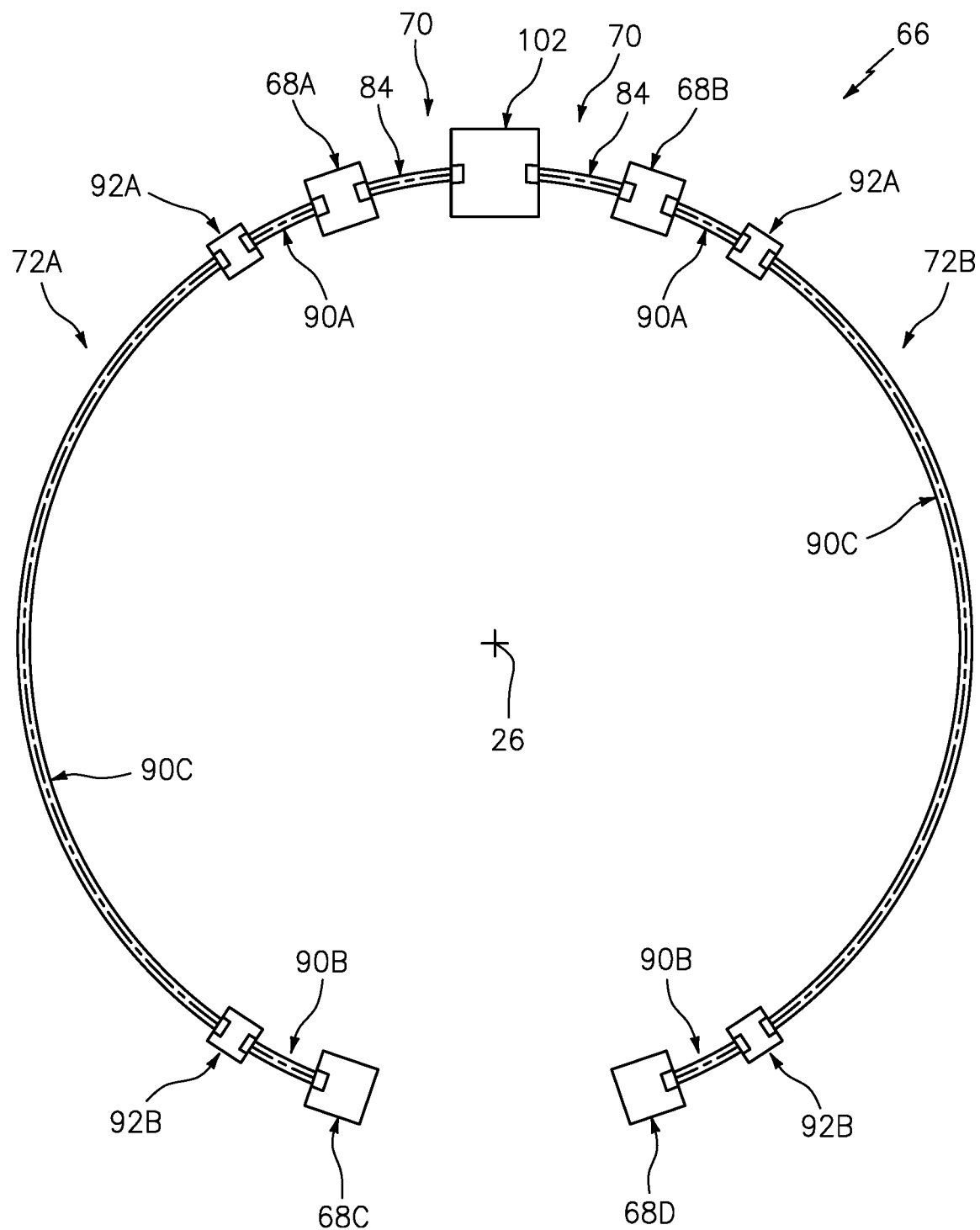
FIG. 5 is a schematic illustration of another actuation system for moving a component of a thrust reverser system.

In some embodiments, referring to FIG. 5, the actuation system 66 may also include a (e.g., central, common) drive device 102; e.g., an electric motor. This drive device 102 is configured to drive operation of any one or more or each of the actuators 68 through the respective linkage systems 70, 72.

Figure 6:
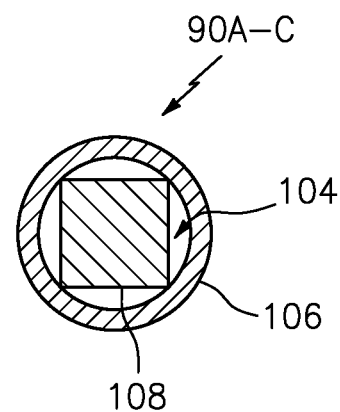
FIG. 6 is a cross-sectional illustration of a linkage shaft.

In some embodiments, referring to FIG. 6, any one or more of the linkage shafts 90 may each be configured with a respective internal (e.g., fluid, lubricant) flow passage 104. This flow passage 104 may be formed between an outer housing 106 (tubular sheath) of the linkage shaft and an inner shaft member 108 of the linkage shaft 90. The flow passage 104 is operable to flow fluid (e.g., lubricant, oil) therethrough, which fluid may cool and/or lubricant the inner shaft member 108 as the member 108 rotates within the outer housing 106.

Figure 7:
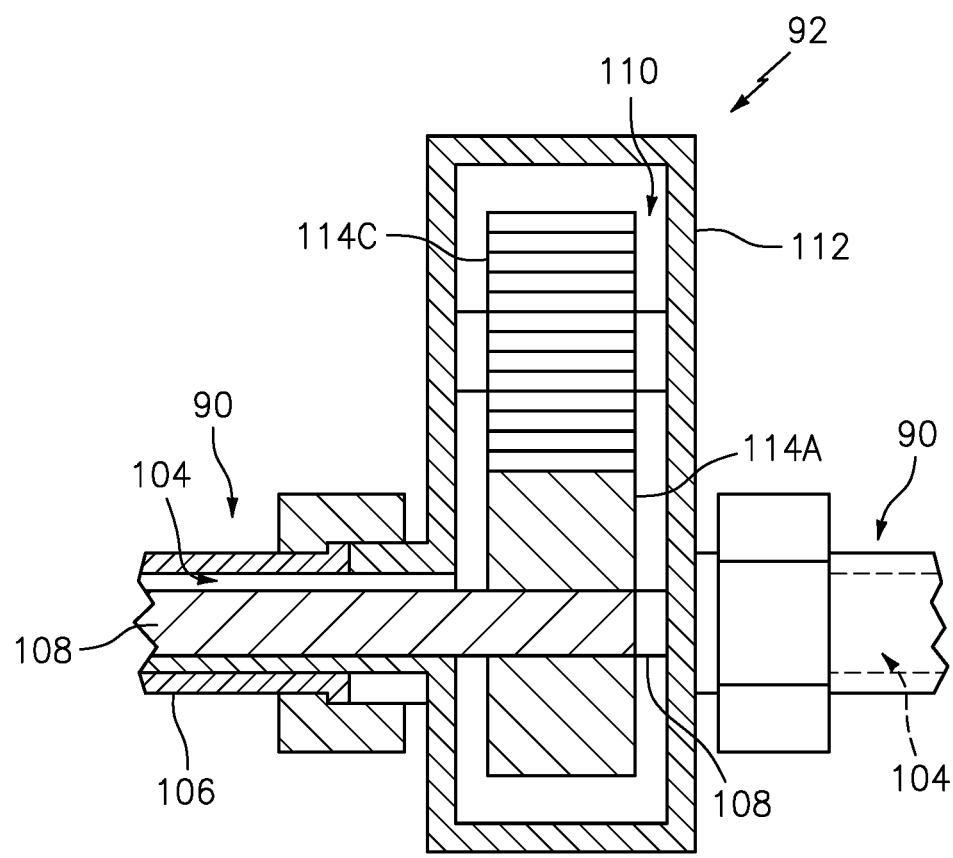
FIG. 7 is a partial cutaway illustration of a gearbox coupled between a pair of linkage shafts.

In some embodiments, referring to FIG. 7, the flow passages 104 within neighboring linkage shafts 90 may be fluidly coupled together through a respective one of the gearboxes 92. Each respective flow passage 104, for example, may be fluidly coupled with an internal cavity 110 of the gearbox 92. Thus, the fluid flowing through the flow passages 104 may also cool and/or lubricant gears within the gearbox 92.

In some embodiments, such as the one of FIG. 7, any one or some or each of the gearboxes 92 may be configured as a wet gearbox. However, in other embodiments, any one or some or each of the gearboxes 92 may be configured as a dry gearbox.

Figure 8:
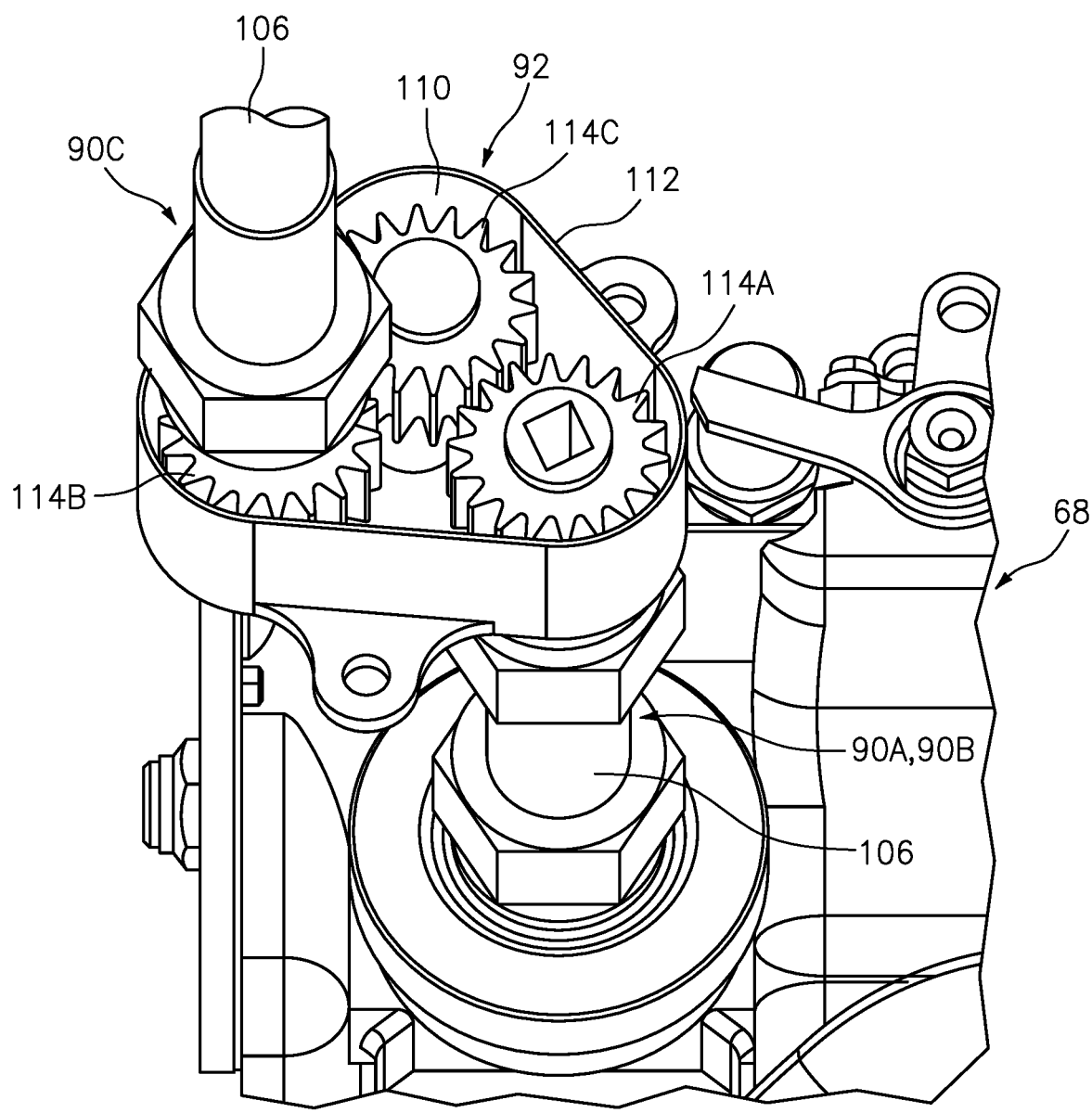
FIG. 8 is a partial perspective cutaway illustration of another gearbox between a pair of linkage shafts.

In some embodiments, referring to FIG. 8, any one or some or each of the gearboxes 92 may each include a housing 112 and a plurality of internal gears 114A-C (generally referred to as "114") arranged within the internal cavity 110 of the housing 112. The internal gears may include a plurality of input/output (I/O) gears 114A and 114B and at least one idler gear 114C. The idler gear 114C of FIG. 8 is meshed with and between the input/output gears 114A and 114B. The idler gear 114C thereby is configured to motively couple the input/output gears 114A and 114B. The input/output gear 114A is coupled to an end of one of the linkage shafts 90A, 90B; e.g., via an inner shaft member receptacle. The input/output gear 114B is coupled to an end of one of the linkage shafts 90C; e.g., via an inner shaft member receptacle.

Figure 9:
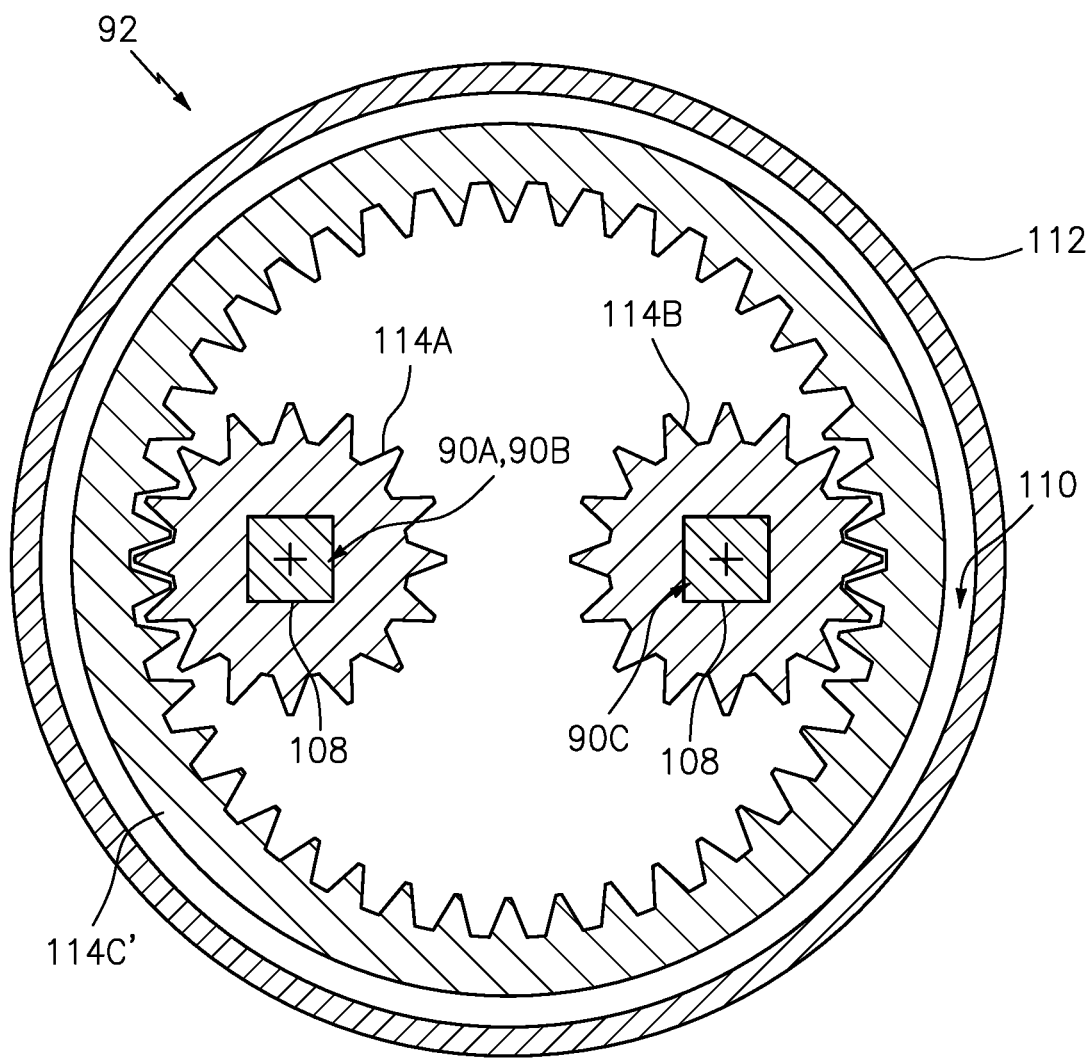
FIG. 9 is a partial perspective cutaway illustration of another gearbox coupled with a pair of linkage shafts.

In some embodiments, referring to FIG. 9, any one or some or each of the gearboxes 92 may each include a ring gear 114C' rather than the idler gear 114C of FIG. 8. This ring gear 114C' circumscribes and is meshed with the input/output gears 114A and 114B.

In some embodiments, referring to FIGS. 8 and 9, any one or some or each of the gearboxes 92 is configured such that the inner shaft members 108 of the linkage shafts 90 rotate in a common direction.

Figure 10:
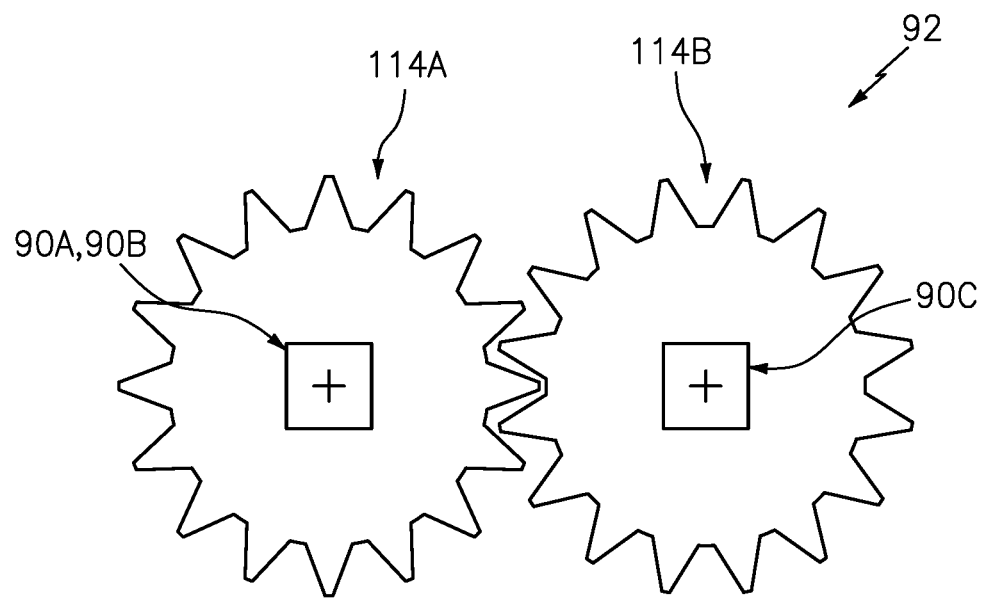
FIG. 10 is an illustration of meshed gears for still another gearbox.

Each gearbox 92 is described above where an input to the gearbox 92 (e.g., via 114A or 114B) rotates in a common direction as an output from the gearbox 92 (e.g., via 114B or 114A). The present disclosure, however, is not limited to such a common rotation configuration. For example, referring to FIG. 10, the input/output gears 114A and 114B may be meshed with one another directly without, for example, an intermediate gear meshed therebetween (e.g., gears 114C, 114C').

Figure 11:
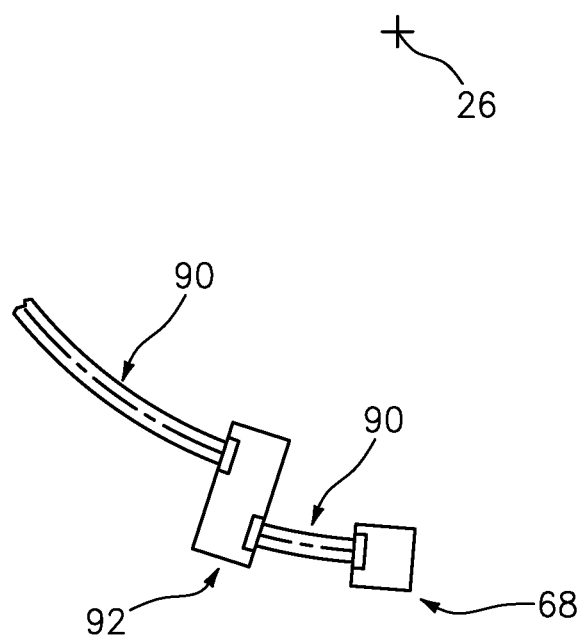
FIG. 11 is a partial schematic illustration of the actuation system configured with radially offset shafts.

Each of the gearboxes 92 is described above as enabling respective ones of the linkage shafts 90 to be offset from one another along the axial centerline 26. One, some or each of the gearboxes 92, however, may also or alternatively enable the respective ones of the linkage shafts 90 to also or alternatively be offset from one another radially relative to the axial centerline. The gearbox 92 in FIG. 11, for example, enables the linkage shafts 90 to be radially offset from one another, which linkage shafts 90 may lie in different axial planes as described above or in a common axial plane along the axial centerline 26.

The actuation system 66 is described above as driving movement (e.g., translation) of the translating sleeve 46 and its translating sleeve segments 54. However, in other embodiments, the actuation system 66 may also or alternatively drive movement (e.g., translation) of one or more other components of the thrust reverser system 38 and/or one or more non-thrust reverser components. For example, in other embodiments, component 116 in FIG. 4 may alternatively be configured as a translating cascade structure (e.g., 64 of FIG. 2) or another translating member to which the blocker doors are coupled, for example. In another example, the component 116 in FIG. 4 may alternatively be configured as a component of a variable area nozzle (VAN) such as, but not limited to, a variable area fan nozzle (VAFN). In still another example, the component 116 of FIG. 4 may alternatively be configured as a translating inlet structure (e.g., a translating body that includes element 32 and/or 34 of FIG. 1) of the nacelle 22 or any other component(s) of the aircraft propulsion system 20 and/or the associated aircraft. The present disclosure therefore is not limited to any particular actuation system application.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:
a first actuator;
a second actuator; and
a linkage system configured to transfer torque between the first actuator and the second actuator, the linkage system including a first linkage shaft, a second linkage shaft and a gearbox, the first linkage shaft having a first centerline, the second linkage shaft having a second centerline offset from the first centerline, and the gearbox coupled to and between the first linkage shaft and the second linkage shaft;

wherein the first linkage shaft comprises a first lubricant flow passage;

wherein the second linkage shaft comprises a second lubricant flow passage; and wherein the gearbox fluidly couples the first lubricant flow passage to the second lubricant flow passage.

2. The assembly of claim 1, wherein the linkage system is coupled to and extends between the first actuator and the second actuator.

3. The assembly of claim 1, wherein the first actuator comprises a linear actuator.

4. The assembly of claim 1, wherein the first actuator comprises a hydraulically driven actuator.

5. The assembly of claim 1, further comprising a motor configured to drive at least the first actuator through the linkage system.

6. The assembly of claim 1, wherein the linkage system extends circumferentially about a rotational axis of the aircraft propulsion system from the first actuator to the second actuator.

7. The assembly of claim 1, wherein the first linkage shaft comprises a flex shaft.

8. The assembly of claim 1, wherein the first linkage shaft comprises a flexible coupling.

9. The assembly of claim 1, wherein
the first linkage shaft extends circumferentially about an axis; and
the first linkage shaft lies in a flat plane perpendicular to the axis.

10. The assembly of claim 1, wherein
the gearbox comprises a first gear, a second gear and an idler gear meshed with and between the first gear and the second gear;
the first gear is coupled with the first linkage shaft; and
the second gear is coupled with the second linkage shaft.

11. The assembly of claim 1, wherein
the gearbox comprises a first gear, a second gear and a ring gear meshed with and circumscribing the first gear and the second gear;
the first gear is coupled with the first linkage shaft; and
the second gear is coupled with the second linkage shaft.

12. The assembly of claim 1, wherein
the linkage system further includes a third linkage shaft and a second gearbox;
the third linkage shaft has a third centerline offset from the second centerline; and
the second gearbox is coupled to and between the second linkage shaft and the third linkage shaft.

13. The assembly of claim 12, wherein
the first linkage shaft and the third linkage shaft lie in a common plane; and
the second linkage shaft lies in another plane offset from the common plane.

14. The assembly of claim 1, further comprising:
a moveable component of the aircraft propulsion system;
at least the first actuator configured to move the moveable component between a first position and a second position.

15. The assembly of claim 1, further comprising:
a thrust reverser component;
at least the first actuator configured to move the thrust reverser component between a first position and a second position.

* * * * *